(12) United States Patent
Jordan (10) Patent No.: US 12,072,027 B2
(45) Date of Patent: Aug. 27, 2024

(54) SEALING DIAPHRAGM FOR A FLUID VALVE AND FLUID VALVE

(71) Applicant: AVS, Ingenieur J.C. Römer GmbH, Grafenau (DE)

(72) Inventor: Denis Jordan, Grafenau (DE)

(73) Assignee: AVS, Ingenieur J.C. Römer GmbH, Grafenau (DE)

( * ) Notice: Subject to any disclaimer, the term of this patent is extended or adjusted under 35 U.S.C. 154(b) by 0 days.

(21) Appl. No.: 18/145,745

(22) Filed: Dec. 22, 2022

(65) Prior Publication Data

US 2023/0204108 A1   Jun. 29, 2023

(30) Foreign Application Priority Data

Dec. 23, 2021   (EP) .................................. 21217245

(51) Int. Cl.
| | |
|---|---|
| *F16K 1/44* | (2006.01) |
| *F16K 11/044* | (2006.01) |
| *F16K 31/06* | (2006.01) |

(52) U.S. Cl.
CPC .............. *F16K 1/44* (2013.01); *F16K 11/044* (2013.01); *F16K 31/0682* (2013.01); *Y10T 137/86622* (2015.04); *Y10T 137/86847* (2015.04)

(58) Field of Classification Search
CPC .. F16K 11/052; F16K 11/072; F16K 31/0627; F16K 31/0641; F16K 31/0682;
(Continued)

(56) References Cited

U.S. PATENT DOCUMENTS 3,420,494 A * 1/1969 Egner ................. F16K 31/0682
                                               251/335.1
4,285,497 A * 8/1981 Gottel .................. F16K 31/105
                                               137/625.65
(Continued)

FOREIGN PATENT DOCUMENTS

| DE | 4224389 A1 | 1/1994 |
|---|---|---|
| DE | 102016114538 A1 | 2/2018 |
| JP | 2009535008 A | 9/2009 |

OTHER PUBLICATIONS

Search Report mailed Jul. 1, 2022, issued in corresponding European Application No. 21217245.6, filed Dec. 23, 2021, 12 pages.
(Continued)

*Primary Examiner* — Robert K Arundale
(74) *Attorney, Agent, or Firm* — Christensen O'Connor Johnson Kindness PLLC (57) ABSTRACT

A sealing diaphragm for a fluid valve is provided. The fluid valve includes a valve housing and a drive unit, the sealing diaphragm being of hat-like design and being configured for enclosing, on the free-end side, a portion of a valve-closing body which projects into the valve housing of the fluid valve. The sealing diaphragm can include a base portion which is configured to be rotationally asymmetrical on the outer circumferential side, the base portion being provided to abut in a form-fitted manner against an opening of the valve housing, and the base portion of the sealing diaphragm being configured to be received between the valve housing and the drive unit in such a way that the opening of the valve housing is sealed in a fluid-tight manner towards the drive unit.

14 Claims, 3 Drawing Sheets

(58) Field of Classification Search
CPC .................. F16K 31/072; F16K 41/10; Y10T 137/86598; Y10T 137/86847
USPC ..................................................... 251/129.2
See application file for complete search history.

(56) References Cited

U.S. PATENT DOCUMENTS

| | | |
|---|---|---|
| 8,757,588 B2 | 6/2014 | Scheibe |
| 2019/0195382 A1* | 6/2019 | Scheibe .............. F16K 31/0682 |
| 2022/0120356 A1* | 4/2022 | Hartmann ........... F16K 27/0263 |

OTHER PUBLICATIONS

Office Action mailed Jan. 4, 2024, in corresponding Japanese application No. 2022-205176, filed Dec. 22, 2022, 11 pages.

* cited by examiner

SEALING DIAPHRAGM FOR A FLUID VALVE AND FLUID VALVE

CROSS-REFERENCE TO RELATED APPLICATION

This application claims priority to European Application Number 21217245.6, filed Dec. 23, 2021, the disclosure of which is hereby incorporated by reference.

FIELD

The present disclosure relates to a fluid valve. More particularly, the present disclosure relates to a fluid valve having a sealing diaphragm.

BACKGROUND

Fluid valves for controlling a fluid flow are known in principle. The fluid is here in particular a liquid. Fluid valves of this type are used in particular in the food sector, for example in water dispensers, coffee machines, etc.

Such fluid valves have a valve housing in which at least one fluid channel is formed. A valve closing body is provided in the valve housing, which is moved by a drive unit, in particular is pivoted about a pivot axis. Due to the pivoting, a sealing diaphragm can be pressed against a valve seat in order to control the fluid flow through the fluid valve.

A major disadvantage of known fluid valves is that they show a relatively large closing behavior variation due to assembly inaccuracies. In particular, it can happen that the fluid valve closes only insufficiently due to the assembly inaccuracies.

SUMMARY

Based on this, an object of the present disclosure is to provide a provide a sealing diaphragm for a fluid valve that allows the fluid valve to close accurately without the need for adjustment.

The object is achieved by a sealing diaphragm comprising the features of independent claim 1. A fluid valve having a sealing diaphragm is the subject matter of further independent claim 3. Embodiments of the sealing diaphragm or of the fluid valve are the subject matter of the subclaims.

According to one aspect, a sealing diaphragm for a fluid valve is disclosed that comprises a valve housing and a drive unit. The sealing diaphragm is formed like a hat and is configured to surround, on the free end side, a portion of a valve closing body that projects into the valve housing of the fluid valve in order to be pressed against a valve seat of the fluid valve, thus ensuring the closing of a fluid channel. The sealing diaphragm comprises a base portion which is formed in a rotationally asymmetric manner on the outer circumferential side. The base portion is provided to abut in a form-fitted manner against an opening of the valve housing. The base portion of the sealing diaphragm is also configured to be received between the valve housing and the drive unit in such a way that the opening of the valve housing is sealed towards the drive unit in a fluid-tight manner.

The technical advantage of the sealing diaphragm is that, due to the rotationally asymmetric shape of the base portion, the sealing diaphragm can only be inserted into the valve housing in a predefined rotary position (with respect to the vertical axis of the sealing diaphragm). As a result, the sealing diaphragm always assumes a defined position with respect to a valve seat arranged in the valve housing so that high-precision functionality of the fluid valve is ensured without adjusting the rotary position of the sealing diaphragm.

According to one exemplary embodiment, the base portion of the sealing diaphragm comprises a polygonal or substantially polygonal shape on the outer circumferential side. In particular, the base portion can have a rectangular or substantially rectangular circumferential shape. The valve housing can comprise a receiving space for the sealing diaphragm, which has an inversely formed opening edge into which the base portion of the sealing diaphragm can be inserted. This ensures that the sealing diaphragm can be inserted into the valve housing very precisely and in a defined rotary position so that the sealing diaphragm assumes a defined orientation relative to the valve seat, and thus a defined closing behavior is achieved.

Alternatively or additionally, the sealing diaphragm can also have a projection or indentation or a recess on the outer circumferential side to achieve rotational asymmetry.

According to a further aspect, a fluid valve is disclosed. The fluid valve comprises a magnetic drive unit for a valve closing body. The drive unit comprises a core, a coil partially surrounding the core, and an armature movable by the energization of the coil and the resulting magnetic force. The valve closing body partially projects into a valve housing, is in operative connection with the armature and, by the movement of the armature about a pivot axis, can be pivotably positioned in at least a first and a second pivot position. The pivot position of the valve closing body switches a fluid connection in the valve housing. The portion of the valve closing body projecting into the valve housing is surrounded, on the free end side, by a sealing diaphragm. The sealing diaphragm is hat-shaped and surrounds the portion of the valve closing body that projects into the valve housing in a fluid-tight manner. The sealing diaphragm also comprises a base portion that is formed on the outer circumferential side in a rotationally asymmetrical fashion and positively (i.e. in a form-fitted manner) abuts against an opening in the valve housing. The base portion of the sealing diaphragm is accommodated between the valve housing and the drive unit in such a way that the opening of the valve housing is sealed in a fluid-tight manner towards the drive unit.

One technical advantage of the fluid valve is that due to the non-rotationally symmetric shape of the base portion the sealing diaphragm can only be inserted into the valve housing in a predefined rotary position (with respect to the longitudinal axis of the sealing diaphragm), among other advantages. As a result, the sealing diaphragm always assumes a defined position with respect to a valve seat arranged in the valve housing so that high-precision functionality of the fluid valve is ensured without adjusting the rotary position of the sealing diaphragm.

According to one exemplary embodiment of the fluid valve, the base portion of the sealing diaphragm comprises a polygonal or substantially polygonal shape on the outer circumferential side. In particular, the base portion can have a rectangular or substantially rectangular circumferential shape. The valve housing can comprise a receiving space for the sealing diaphragm, which has an inversely formed opening edge into which the base portion of the sealing diaphragm can be inserted. This ensures that the sealing diaphragm can be inserted into the valve housing very precisely and in a defined rotary position so that the sealing diaphragm assumes a defined orientation relative to the valve seat, and thus achieving a defined closing behavior.

Alternatively or additionally, the sealing diaphragm can also have a projection or indentation or a recess on the outer circumferential side in order to achieve rotational asymmetry.

According to one exemplary embodiment of the fluid valve, the base portion of the sealing diaphragm comprises an inner opening that has a round or polygonal shape on the inner circumferential side. Through this inner opening, the valve closing body can extend into the sealing diaphragm and, moreover, the sealing diaphragm can be pressed against the valve housing to establish tightness.

According to one exemplary embodiment of the fluid valve, the valve housing comprises a receiving space with an opening. The edge of the opening of the receiving space forms a radial sealing surface on the circumferential side, which is provided for the abutment of the base area of the sealing diaphragm. By pressing the foot area of the sealing diaphragm against the edge of the opening of the receiving space and the resulting radial sealing, the transition between the valve housing and the drive unit is effectively sealed.

According to one exemplary embodiment of the fluid valve, the opening of the receiving space comprises a rotationally asymmetrical circumferential shape. This circumferential shape can be adapted to the outer circumferential shape of the base area of the sealing diaphragm so that the latter can be inserted into the opening of the receiving space in an form-fitted manner.

According to one exemplary embodiment of the fluid valve, the drive unit comprises a valve housing carrier configured to be coupled to the valve housing. The valve housing carrier comprises an extension that projects towards the valve housing and is form-fitted to the inner opening of the base portion of the sealing diaphragm. When the drive unit and the valve housing are assembled, the extension is inserted into the inner opening of the base portion of the sealing diaphragm, and thus fixing the sealing diaphragm in its position.

According to one exemplary embodiment of the fluid valve, the base portion of the sealing diaphragm is radially pressed between the valve housing and the extension of the valve housing carrier by assembling the valve housing and the drive unit. In particular, the extension of the valve housing carrier is pressed against the sealing diaphragm on the inner circumferential side and in this way applying a pressure acting radially outwards on the sealing diaphragm, as a result of which the radial compression is achieved. Thus, a high degree of tightness is achieved at the interface between the valve housing and the drive unit.

According to one exemplary embodiment of the fluid valve, the sealing diaphragm comprises a cap portion with an internal cross-section that is adapted to the shape of the portion of the valve closing body projecting into the valve housing in such a way that the portion of the valve closing body is positively received (i.e. in a form-fitted manner) in the cap portion of the sealing diaphragm. Thus, a secure connection of the sealing diaphragm to the valve closing body is achieved, which is advantageous for the closing behavior of the fluid valve.

According to one exemplary embodiment of the fluid valve, the cap portion of the sealing diaphragm comprises a rectangular or substantially rectangular cross-section with a pair of broadsides and a pair of narrow sides. The broadsides are here longer than the narrow sides. The rectangular cross-sectional shape ensures that, on the one hand, the sealing diaphragm provides a relatively large-area abutment against the valve seat but, on the other hand, the sealing diaphragm can be pivoted in the receiving space of the valve housing due to the smaller width of the narrow sides.

According to one exemplary embodiment of the fluid valve, at least one broadside of the cap portion is provided for abutment against a valve seat formed in the valve housing. In particular, the broadside of the cap portion is pressed against the valve seat by means of the valve closing body. As a result, a relatively large-area valve opening provided in the area of the valve seat can be closed by the sealing diaphragm.

According to one exemplary embodiment of the fluid valve, the valve housing comprises a coupling contour for connection to the drive unit. The coupling contour is configured in such a way that a defined coupling of the valve housing to the drive unit is effected with respect to the rotary position of the drive unit relative to the valve housing. This ensures that the coupling between the drive unit and the valve housing takes place in a defined rotary position and thus that the valve closing body comprises a defined orientation relative to the valve seat. As a result, a well-defined closing behavior of the fluid valve is achieved.

According to one exemplary embodiment of the fluid valve, the coupling contour comprises coupling portions configured for attaching the valve housing to the drive unit by means of a snap mechanism. Thus, a tool-less and quick coupling of the drive unit to the valve housing can be achieved.

According to one exemplary embodiment, the valve housing comprises at least one support for a hose quick coupling. This allows hoses to be coupled directly to the valve housing, thereby reducing the installation effort.

In the sense of the present disclosure, the expressions "approximately", "substantially," or "about" mean deviations from the respective exact value by +/−5-10% and/or deviations in the form of changes that are insignificant for the function.

Further embodiments, advantages and possible applications of the present disclosure also result from the following description of exemplary embodiments and from the drawings. In this connection, all the features described and/or illustrated are in principle the subject matter of the present disclosure, either individually or in any combination, irrespective of their summary in the claims or their back-reference. Also, the contents of the claims are made a part of the description.

BRIEF DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

Figure 1:
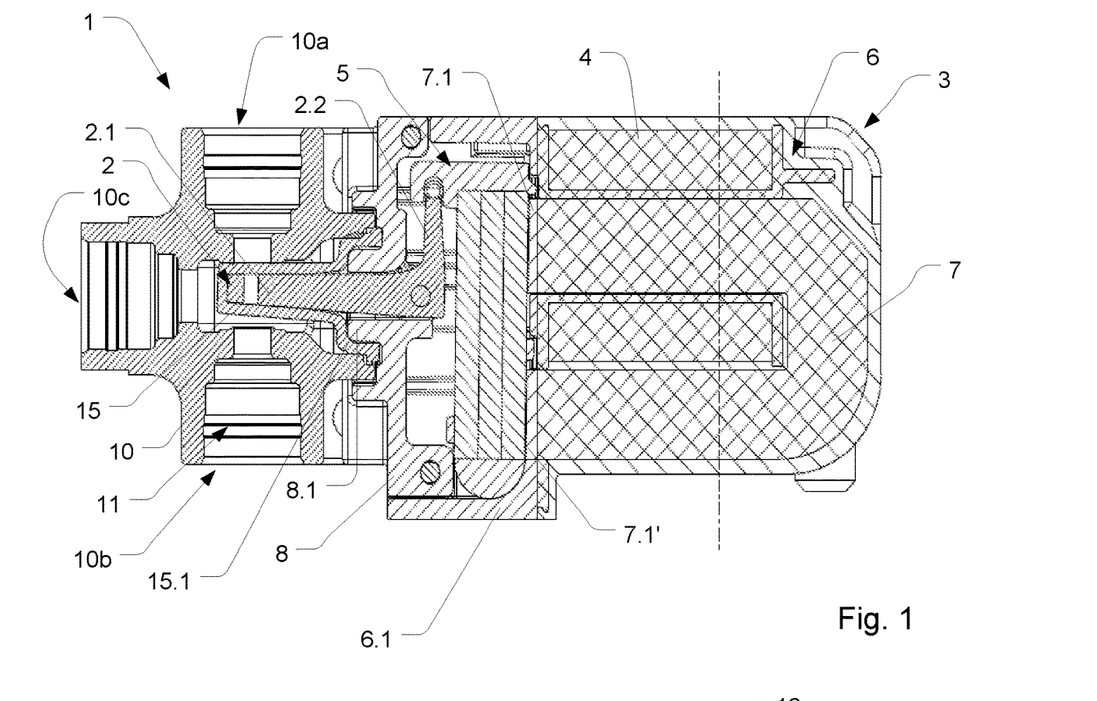
FIG. 1 shows, by way of example, a longitudinal a longitudinal sectional view of a fluid valve.

FIG. 1 shows, by way of example and schematically, a longitudinal sectional view centrally through a fluid valve 1 having a valve housing 10.

The fluid valve 1 comprises a drive unit 3 for a valve closing body 2 and a valve housing 10, in which at least one fluid channel 11 is provided. The valve closing body 2 extends into the valve housing 10 and is coupled to the drive unit 3 in such a way that the valve closing body 2 can be moved, in particular pivoted, by the drive unit 3. In particular, the valve closing body 2 can assume a first and a second pivot position in order to release or close a valve opening 10.1 depending on the pivot position. In the illustrated exemplary embodiment, the valve housing 10 comprises three ports 10*a*, 10*b*, 10*c*, a pair of ports 10*a*, 10*b*, 10*c* being fluidly connected to one another in each case depending on the pivot position of the valve closing body 2. Deviating from this, however, the fluid valve 1 can also have only two ports 10*a*, 10*b*, 10*c*, a fluidic connection between the two ports being released or not, depending on the pivot position of the valve closing body 2. The valve housing 10 can have a support 17 for a hose quick coupling at each of the ports 10*a*, 10*b*, 10*c*. The hose quick coupling can be configured in such a way that a free end of a hose can be inserted into the hose quick coupling, thereby establishing a fluid-tight connection between the interior of the hose and the fluid channel 11 formed in the valve housing 10. The hose quick coupling can also comprise securing elements to prevent undesired disengagement of the hose from the hose quick coupling.

The fluid valve 1 has, for example, the following functionality: the drive unit 3 is designed to influence the pivot position of an armature 5. The drive unit 3 is, for example, an electromagnetic drive unit, i.e. when a coil 4 of the drive unit 3 is energized, a magnetic force is generated by means of which the armature 5 is moved from a second pivot position to a first pivot position. This first pivot position is shown in FIG. 1. This first pivot position is held as long as the coil 4 is energized. The armature 5 can be spring-loaded by means of a spring in such a way that it is moved back to the second pivot position after the current flow through the coil 4 has ended.

As shown in FIG. 1, the valve closing body 2 is coupled to the armature 5 in such a way that the valve closing body 2 is moved, in particular pivoted, by the armature 5. In particular, the valve closing body 2 assumes a first or second position in the valve housing 10 depending on the pivot position of the armature 5 and thus defines the valve position, respectively, the release or closing of at least one fluid channel 11.

The drive unit 2 comprises, for example, a main body 6. The main body 6 forms the supporting basic structure of the drive unit 3. It can configured as an injection-molded part, in particular as a plastics injection-molded part. The main body 6 comprises a tubular or substantially tubular support for the coil 4. A first insertion opening is formed within the support, into which a leg of a U-shaped core 7 can be inserted.

The main body 6 also comprises an armature support 6.1. This armature support 6.1 directly adjoins the support for the coil 4 and is designed to pivotably mount the armature 5. The armature support 6.1 has, for example, a box-like, in particular a rectangular box-like shape, and has a bottom region and a plurality of wall regions. The wall regions are connected to the bottom region, surround the bottom region circumferentially and project from the bottom region, namely to a side facing away from the coil 4.

A second insertion opening is provided in the bottom region, into which a second leg of a U-shaped core 7 is insertable. The U-shaped core 7 is thus yoke-shaped, one leg of the core 7 being surrounded by the coil 4 so that, when the coil 4 is energized, a closed magnetic circuit is formed by the core 7 and the armature 5 spanning the pole faces 7.1, 7.1' of the core 7.

A valve housing carrier 8 is provided on the armature support 6.1 on the side facing away from the core 7 or coil 4. The valve housing carrier 8 is configured to establish the connection between the drive unit 2 and the valve housing 10. The valve housing carrier 8 is connected, for example, to the wall of the armature support 6.1 and, in particular, closes the armature support 6.1, which is formed in the manner of a box, apart from a lead-through opening for the valve closing body 2.

The valve housing support 8 comprises fastening elements by means of which the valve housing 10 can be detachably fastened to the drive unit 2. As can be seen in particular in FIG. 2, the valve housing 10 has, for example, a plurality of lug-like coupling portions 16.1 which interact with detent lugs on the valve housing carrier 8 and are used to establish a locking connection with the valve housing carrier 8. An inversely designed fixation is also conceivable in principle, i.e. that the coupling portions are provided on the valve housing carrier 8, which interact with detent lugs of the valve housing 10.

Figure 2:
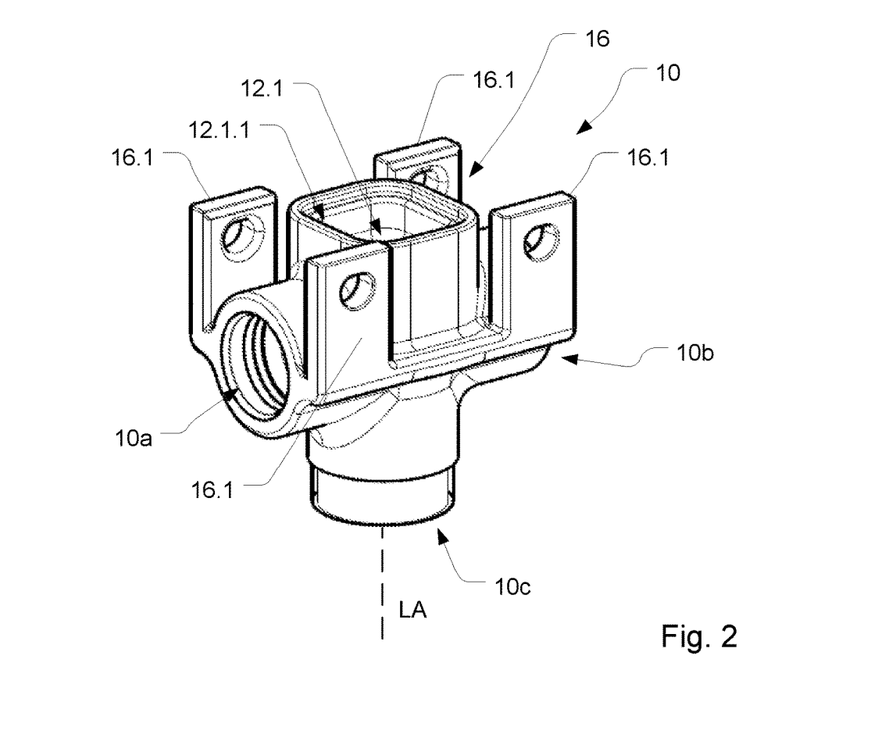
FIG. 2 shows, by way of example, a perspective view of a valve housing.

FIG. 2 shows a perspective side view of the valve housing 10. The valve housing 10 comprises a coupling contour 16 on the upper side, which is adapted in shape to the drive unit 3, in particular the valve housing support 8, in such a way that a coupling between the drive unit 3 and the valve housing 10 is only possible in a defined rotary position. This ensures that the valve closing body 2, which projects from the bottom of the drive unit 3, is inserted into the valve housing 10 in a predetermined orientation so that the valve closing body 2 assumes a defined orientation relative to the valve seat and thus achieves a desired closing effect.

Figure 3:
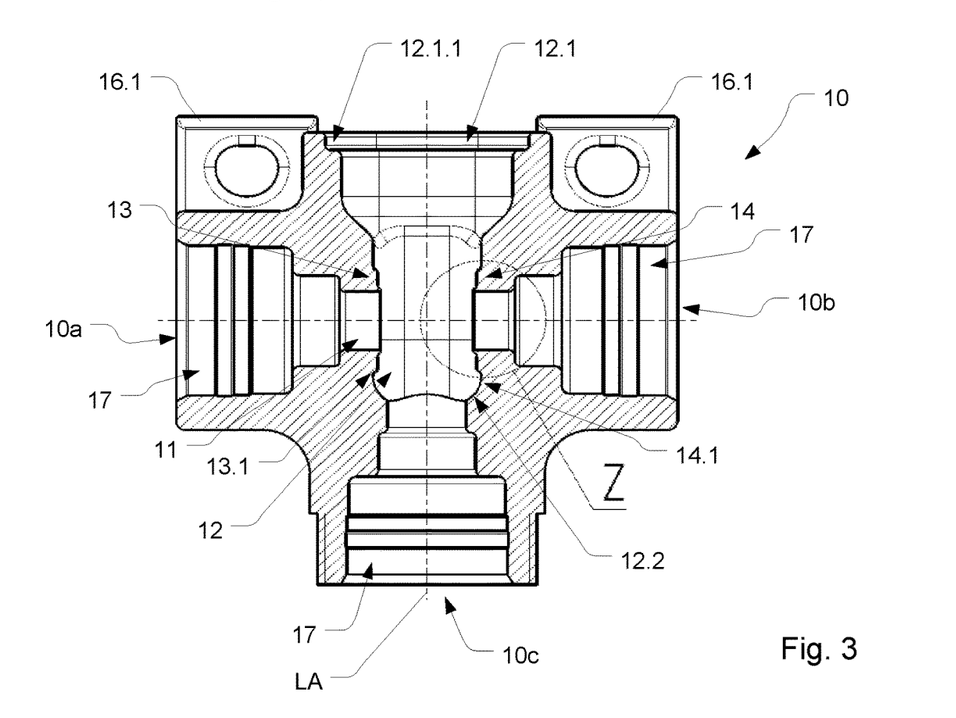
FIG. 3 shows, by way of example, a longitudinal sectional view centrally through the valve housing illustrated in FIG. 2.

FIG. 3 shows a sectional view centrally through the valve housing 10 shown in FIG. 2 so as to provide a longitudinal section through the fluid channels 11 formed in the valve housing 10.

In the valve housing 10, a pair of ports 10*a*, 10*b* is provided diametrically opposite one another and another port 10*c* is provided below and opposite the opening 12.1 of the receiving space 12. In this exemplary embodiment, a fluid communication can be established between either the ports 10*a* and 10*c* or the ports 10*b* and 10*c* depending on the position of the valve closing body. In this case, the fluid valve 1 forms a fluid switch in which the port 10*c* acting as an inlet is coupled to either the port 10*a* or the port 10*b* as an outlet, or in which the port 10*c* acting as an outlet is coupled to either the port 10*a* or the port 10*b* as an inlet.

In an alternative exemplary embodiment, the port 10*b* can be omitted so that the fluid channel between the ports 10*a* and 10*c* is either open or closed by the fluid valve 1—depending on the switching state.

In the illustrated exemplary embodiment, the valve closing body 2 comprises two legs 2.1, 2.2. The first leg 2.1 projects into the receiving space 12. A second leg 2.2 can be oriented obliquely, in particular at right angles or substantially at right angles to the first leg 2.1 and connects the valve closing body 2 to the armature 5.

The first leg 2.1 is partially, and in particular in the region of its free end, surrounded by the sealing diaphragm 15. The sealing diaphragm 15 is used, on the one hand, as a sealing element for sealing a valve opening 10.1 provided at the valve seat and, on the other hand, for sealing the opening 12.1 of the receiving space 12 towards the drive unit 3.

The at least one valve seat 13, 14 is provided in the receiving space 12. The valve seat 13, 14 can be provided on the side wall of the receiving space 12, which is parallel or substantially parallel to the longitudinal axis LA of the receiving space 12. In the illustrated exemplary embodiment, a pair of valve seats 13, 14 is provided on opposite side walls of the receiving space 12 such that a first valve seat 13 is opposite a second valve seat 14 in a diametrical fashion and at the same height position.

The valve housing 10 is formed, for example, in one piece as an injection molded part, in particular as a plastics injection molded part. The at least one valve seat 13, 14 projects into the receiving space 12 in such a way that an undercut 13.1, 14.1 is formed by the valve seat 13, 14. The undercut 13.1, 14.1 is here provided in the lower region 12.2 of the receiving space 12 and below the valve seats 13, 14 opposite the opening 12.1.

Figure 4:
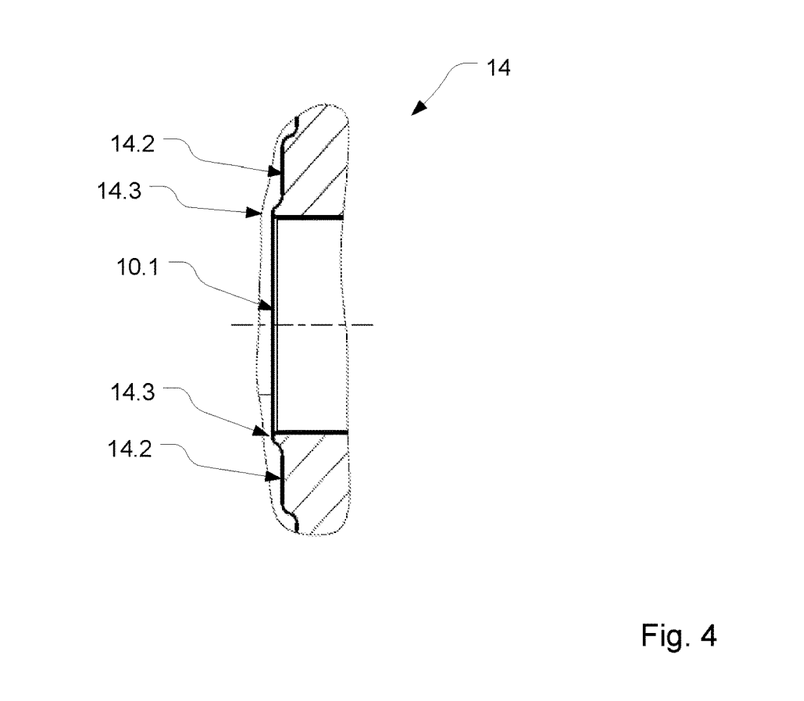
FIG. 4 shows, by way of example, a detailed view of the area marked Z in FIG. 3 to illustrate the valve seat.

FIG. 4 shows by way of example the design of the second valve seat 14 in more detail. It should be noted that the first valve seat 13 can be identical in design to the second valve seat 14. The valve seat 14 comprises an elevation 14.2 which is annular and has in particular the shape of a circular ring and projects from the side wall into the receiving space 12. Inside the elevation 14.2 that has the shape of a circular ring, the valve opening 10.1 is provided which, when the valve closing body 2 provided with the sealing diaphragm 15 abuts, is closed by this valve closing body in fluid-tight fashion.

The elevation 14.2 forms a flat abutment for the sealing diaphragm 15 or the valve closing body 2 so that the valve closing body 2 is limited in its pivot travel by the elevation 14.2.

In some embodiments, the armature 5 is held in the armature support 6.1 without a stop, i.e. the pivoting movement of the armature 5 is not limited in either the first or the second pivot position by an armature portion abutting against components surrounding the armature 5. The limitation of the pivoting movement of the armature 5 is rather caused by the valve closing body 2, which, depending on the pivot position of the armature 5, comes into abutment against the valve seats 13, 14 or, in the case where only one valve seat is provided, against a stop opposite this valve seat in the valve housing 10.

A sealing edge 14.3 can be provided on the elevation 14.2 and is configured to be pressed into the sealing diaphragm 15 when the sealing diaphragm 15 abuts against the elevation 14.2. This ensures a high degree of tightness of the valve opening 10.1 closed by the valve closing body 2.

The sealing diaphragm 15 and the interaction of the sealing diaphragm with the valve housing 10 or the drive unit 3 are described in more detail below.

Figure 5:
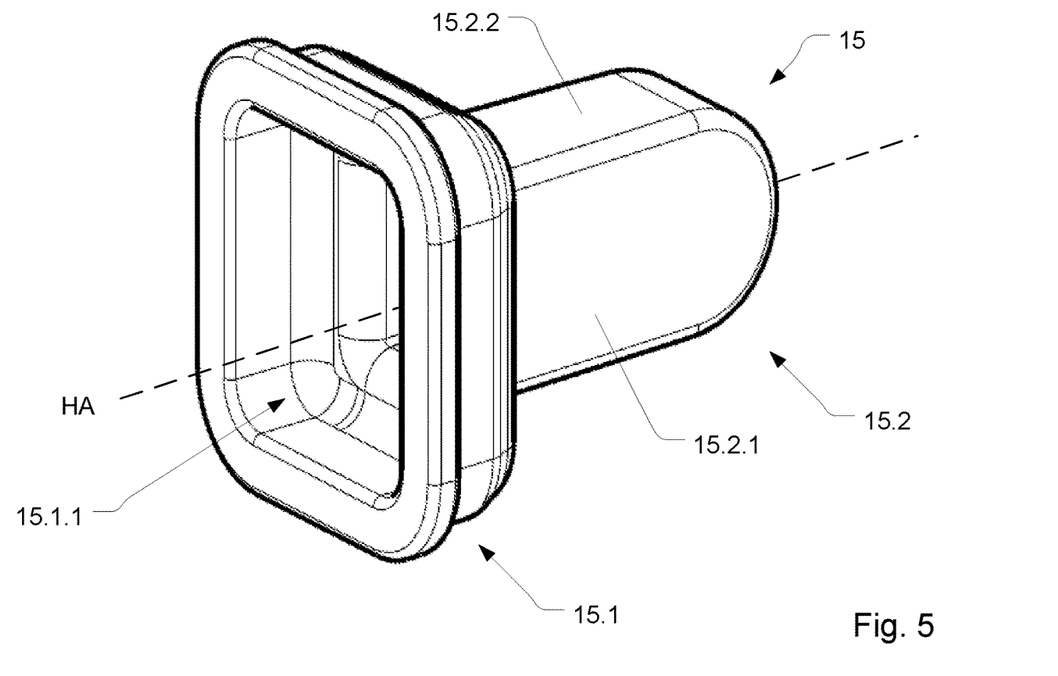
FIG. 5 shows, by way of example, a perspective view of a sealing diaphragm.

FIG. 5 shows a perspective view of the sealing diaphragm 15 in a stand-alone position. The sealing diaphragm 15 has a hat-like or cap-like shape and comprises a base portion 15.1 and a cap portion 15.2. Hat-like or cap-like shape means in the sense of the present disclosure that the sealing diaphragm 15 has an inner space which is accessible via an inner opening 15.1.1, but is otherwise closed in order to allow the sealing of the valve housing 10 towards the drive unit 3.

The base portion 15.1 is interlockingly fitted with regard to the opening 12.1 of the receiving space 10. The base portion 15.1 has a rotationally asymmetrical circumferential shape, in the illustrated exemplary embodiment a polygonal circumferential shape with rounded corners. As can be seen in FIG. 2, the opening 12.1 of the receiving space 12 has a corresponding inverse shape so that the base portion 15.1 can be inserted into the opening 12.1 with an interlocking fit. This ensures that the sealing diaphragm 15 can only be inserted into the valve housing 10 in a predetermined rotary position (rotary position with respect to the vertical axis HA of the sealing diaphragm 15). This has the decisive advantage that the cap portion 15.2 projecting into the receiving space 12 thus assumes a fixed predetermined orientation relative to the at least one valve seat 13, 14 and thus no leakage can occur due to an incorrectly aligned sealing diaphragm 15.

In some embodiments, the rotationally asymmetric circumferential shape of the sealing diaphragm 15 is selected such that an installation of the sealing diaphragm 15 in the valve housing 10 is only possible in a predefined rotational orientation (i.e. the rotary position about the longitudinal axis LA as the axis of rotation). Alternatively, the sealing diaphragm 15 can, for example, be formed in mirror symmetry with respect to a center plane so that an installation is possible in two rotary positions that are rotated 180° with respect to each other.

As can be seen in FIG. 1, the sealing diaphragm 15 is provided between the drive unit 3 and the valve housing 10 to seal the valve housing 10 towards the drive unit. The valve housing carrier 8 of the drive unit 3 has an extension 8.1, which abuts with its outer side on the inner circumferential side against the inner opening 15.1.1 of the base area 15.1 of the sealing diaphragm 15. The extension 8.1 is adapted in shape to the inner opening 15.1.1 of the base area 15.1 in such a way that the sealing diaphragm 15 in the base area 15.1 is pressed radially against the edge 12.1.1 of the opening 12.1, thereby sealing the receiving space 12 at the transition between the valve housing 10 and the valve housing carrier 8. In particular, the sealing diaphragm 15 is radially pressed between the extension 8.1 of the valve housing carrier 8 and the valve housing 10.

Figure 6:
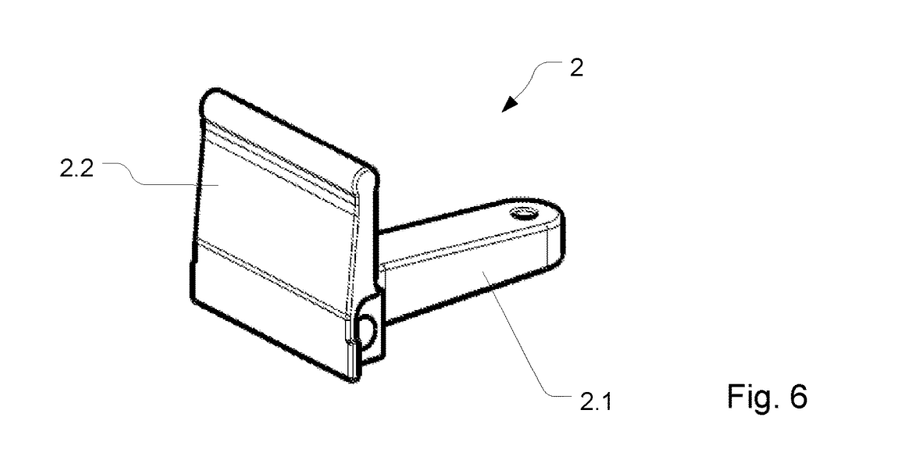
FIG. 6 shows, by way of example, a perspective view of a valve closing body.

As can be seen from a combined consideration of FIGS. 5 and 6, the cap portion 15.2 of the sealing diaphragm 15 is adapted in shape to the free end of the first leg 2.1 of the valve closure body 2 so that the free end of the first leg 2.1 is received in the sealing diaphragm 15 in a form-fitted manner. In particular, the cap portion 15.2 has a rectangular or substantially rectangular cross-section (cross-sectional plane perpendicular to the vertical axis HA) and is circumferentially limited by a pair of mutually parallel and spaced broadsides 15.2.1 and a pair of mutually parallel and spaced narrow sides 15.2.2. The broadsides 15.2.1 are here longer than the narrow sides 15.2.2. The wall thickness of the cap portion 15.2 can be circumferentially constant or substantially constant so that the recess inside the cap portion 15.2 also has a rectangular or substantially rectangular cross-sectional shape. Thus, the cap portion 15.2 is configured to positively receive (i.e. in a form-fitted manner) the free end of the first leg 2.1 of the valve closing body 2. This ensures that the broadsides 15.2.1 of the cap portion 15.2 are aligned parallel to the at least one valve seat 13, 14 so as to achieve an exact closing behavior of the fluid valve.

In some embodiments, the free end of the sealing diaphragm 15 is also adapted in shape to the free end of the valve closing body 2. In particular, both the sealing diaphragm 15 and the first leg 2.1 of the valve closing body 2 have a rounded free end so that improved flow around the sealing diaphragm is achieved.

The present disclosure has been described above with reference to exemplary embodiments. It is understood that numerous modifications as well as variations are possible without leaving the scope of protection defined by the claims.

LIST OF REFERENCE SIGNS 1 fluid valve
2 valve closing body
2.1 first leg
2.2 second leg
3 drive unit
4 coil
5 armature
6 main body
6.1 armature support
7 core
7.1, 7.1' pole face
8 valve housing carrier
8.1 extension
10 valve housing
10a, b, c port
10.1 valve opening
11 fluid channel
12 receiving space
12.1 opening
12.1.1 edge
12.2 lower region
13 first valve seat
13.1 undercut
14 second valve seat
14.1 undercut
14.2 annular elevation
14.3 sealing edge
15 sealing diaphragm
15.1 base area
15.1.1 inner opening
15.2 cap portion
15.2.1 broadside
15.2.2 narrow side
16 coupling contour
16.1 coupling portion
17 support
HA vertical axis
LA longitudinal axis of the receiving space In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure.

Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A sealing diaphragm for a fluid valve, the sealing valve comprising:
    a valve housing; and
    a drive unit having a valve housing carrier configured to couple to the valve housing,
    wherein the sealing diaphragm has a hat-like design and is configured to enclose, on the free-end side, a portion of a valve closing body which projects into the valve housing of the fluid valve,
    wherein the sealing diaphragm has a base portion which is formed in a rotationally asymmetrical fashion on the outer circumferential side,
    wherein the base portion is configured to abut in a form-fitted manner against an opening of the valve housing, wherein the valve housing carrier comprises an extension which is form-fitted to the inner opening of the base portion of the sealing diaphragm, and wherein the base portion of the sealing diaphragm is configured to be received between the valve housing and the drive unit in such a way that the opening of the valve housing is sealed in a fluid-tight manner towards the drive unit.

2. The sealing diaphragm of claim 1, wherein the base portion of the sealing diaphragm comprises a polygonal or substantially polygonal shape on the outer circumferential side.

3. A fluid valve, comprising:

a magnetic drive unit for a valve closing body, wherein the drive unit comprises a core, a coil partially surrounding the core, and an armature movable by the energization of the coil and the resulting magnetic force, wherein the valve closing body partially projects into a valve housing, wherein the valve closing body is in operative connection with the armature, wherein the valve closing body can be pivoted about a pivot axis in at least a first and a second pivot position by the movement of the armature, wherein a fluid connection in the valve housing is switched by the pivot position of the valve closing body, wherein the portion of the valve closing body projecting into the valve housing is surrounded on the free-end side by a sealing diaphragm, wherein the sealing diaphragm is of hat-like design and surrounds the portion of the valve closing body projecting into the valve housing in a fluid-tight manner, wherein the sealing diaphragm has a base portion, which is formed to be rotationally asymmetrical on the outer circumferential side and abuts in interlocking manner against an opening of the valve housing, wherein the drive unit further comprises a valve housing carrier configured to couple to the valve housing, wherein the valve housing carrier comprises an extension which is form-fitted to the inner opening of the base portion of the sealing diaphragm, and wherein the base portion of the sealing diaphragm is received between the valve housing and the drive unit in such a way that the opening of the valve housing is sealed in a fluid-tight manner towards the drive unit.

4. The fluid valve of claim 3, wherein the base portion of the sealing diaphragm has a polygonal or substantially polygonal shape on the outer circumferential side.

5. The fluid valve of claim 3, wherein the base portion of the sealing diaphragm has an inner opening which has a round or polygonal shape on the inner circumferential side.

6. The fluid valve of any one of claim 3, wherein the valve housing comprises a receiving space with an opening, and in that the edge of the opening of the receiving space forms, on the circumferential side, a radial sealing surface which is provided for the abutment of the base portion of the sealing diaphragm.

7. The fluid valve of claim 6, wherein the opening has a rotationally asymmetrical circumferential shape.

8. The fluid valve of claim 3, wherein the base portion of the sealing diaphragm is radially pressed between the valve housing and the extension of the valve housing carrier by the assembly of the valve housing and the drive unit.

9. The fluid valve of claim 3, wherein the sealing diaphragm comprises a cap portion with an inner cross-section which is adapted to the shape of the portion of the valve closing body projecting into the valve housing in such a way that the portion of the valve closing body is positively received in the cap portion of the sealing diaphragm.

10. The fluid valve of claim 9, wherein the cap portion of the sealing diaphragm comprises a rectangular or substantially rectangular cross-section with a pair of broadsides and a pair of narrow sides, the broadsides being longer than the narrow sides.

11. The fluid valve of claim 10, wherein at least one broadside of the cap portion is provided for abutment against a valve seat formed in the valve housing.

12. The fluid valve of claim 3, wherein the valve housing comprises a coupling contour for connection to the drive unit, and in that the coupling contour is designed so as to effect a coupling of the valve housing to the drive unit, which is predetermined with respect to the rotary position of the drive unit relative to the valve housing.

13. The fluid valve of claim 12, wherein the coupling contour comprises coupling portions which are configured for fastening the valve housing to the drive unit by means of a snap mechanism.

14. The fluid valve of claim 3, wherein the valve housing comprises at least one support for a hose quick coupling.

* * * * *